(12) United States Patent
Duret

(10) Patent No.: US 7,064,750 B2
(45) Date of Patent: Jun. 20, 2006

(54) DEVICE AND SYSTEM FOR LOCATING THE POSITION OF THE TIP OF A PEN ON A DIGITISING BOARD

(75) Inventor: Denis Duret, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 620 days.

(21) Appl. No.: 10/150,024

(22) Filed: May 20, 2002

(65) Prior Publication Data

US 2002/0180714 A1     Dec. 5, 2002

(30) Foreign Application Priority Data

Jun. 5, 2001 (FR) .................................. 01 07322

(51) Int. Cl.
*G09G 5/00* (2006.01)
(52) U.S. Cl. ...................................... 345/179; 345/173
(58) Field of Classification Search ........ 345/173–179, 345/711, 856, 851; 178/18.01–18.09, 19.01
See application file for complete search history.

(56) References Cited

U.S. PATENT DOCUMENTS

| | | | | |
|---|---|---|---|---|
| 4,613,866 A | * | 9/1986 | Blood | 342/448 |
| 4,845,503 A | * | 7/1989 | Adam et al. | 342/448 |
| 5,521,367 A | * | 5/1996 | Bard et al. | 235/472.01 |
| 5,640,170 A | * | 6/1997 | Anderson | 343/895 |
| 5,708,458 A | * | 1/1998 | Vrbanac | 345/156 |
| 5,748,110 A | * | 5/1998 | Sekizawa et al. | 341/5 |
| 5,831,601 A | * | 11/1998 | Vogeley et al. | 345/175 |
| 5,902,968 A | * | 5/1999 | Sato et al. | 178/19.01 |
| 6,577,299 B1 | * | 6/2003 | Schiller et al. | 345/179 |
| 2002/0134594 A1 | * | 9/2002 | Taylor et al. | 178/18.01 |

* cited by examiner

*Primary Examiner*—Alexander Eisen
(74) *Attorney, Agent, or Firm*—Oblon, Spivak, McClelland, Maier & Neustadt, P.C.

(57) ABSTRACT

The present invention relates to a device intended for locating the tip of a pen on a writing board, the pen and the board being part of a writing digitizing system further comprising at least two magnetic dipoles, each being coupled with a current source so as to create distinct magnetic fields which are perpendicular to the writing board.

Figure 1:
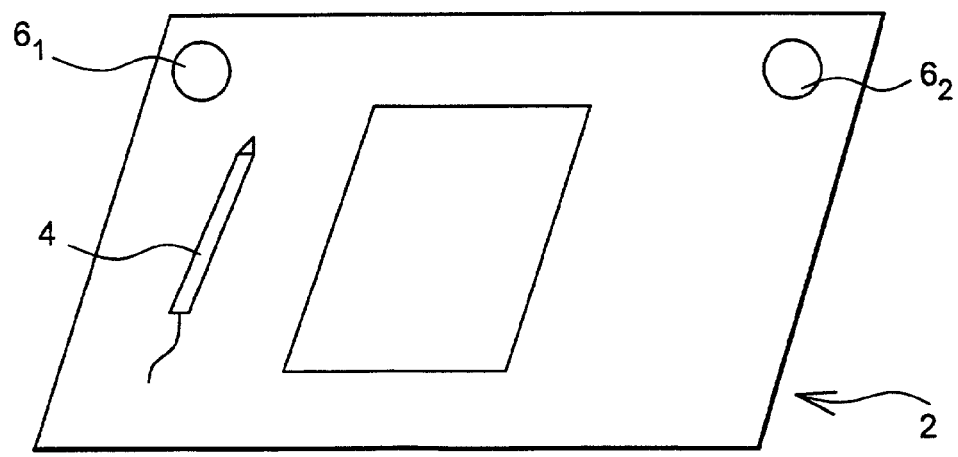

According to the invention, the pen comprises a first sensor intended for measuring the magnetic fields produced by each magnetic dipole, and a second sensor intended for measuring the inclination angle $\theta$ of the pen with respect to the vertical, and transmission means for delivering data supplied by the first and second sensors to a processing unit to compute the position of the pen tip onto the writing surface in terms of the measured magnetic fields and angle $\theta$ values.

12 Claims, 2 Drawing Sheets

DEVICE AND SYSTEM FOR LOCATING THE POSITION OF THE TIP OF A PEN ON A DIGITISING BOARD

The invention relates to a device and a system intended for locating the tip of a pen on a writing board, the pen and the board being part of a writing digitising system further comprising at least two magnetic dipoles, each being coupled with a current source so as to create two distinct magnetic fields.

The invention also relates to a writing digitising system and a pen liable to be used by this system.

The invention has its application in the domain of laptops, electronic agendas, or during teleconferences when a handwrit document must be sent in real time to several people communicating via an internet-type network.

PRIOR ART

A device exists whose function is to locate the tip of a pen, which is part of a writing digitising system comprising a digital board provided with means to convert pen positions into digital data which then are either stored into a memory located in the table, or sent by radio link to a computer which uses a processing software for decoding the digital data and yield the corresponding alphanumeric codes.

The Pen locating function is obtained, in this system, thanks to a predefined coordinate system covering the digital board surface.

The drawback of this device is that pen location can be obtained only on the table specifically designed for that purpose.

Another device, described in document WO 99/39302, involves a camera mounted on the pen and a pen motion tracking algorithm. This device is expensive and the involved algorithm is complex.

The invention intends to overcome the drawbacks of the above described prior art by means of a pen tip locating device operating on any writing board, submitted to a magnetic field generated by at least two dipoles.

According to the invention, the pen includes a first sensor intended for measuring magnetic fields produced by each one of the magnetic dipoles and a second sensor intended for measuring the inclination angle $\theta$ of the pen axis with respect to the vertical and transmission means for delivering data supplied by the said first and second sensors to a processing unit intended for computing the position of the pen tip on the surface of the writing board in terms of the measured magnetic fields values and the measured angle $\theta$ values.

According to the invention, the processing unit is provided with a software which calculates by triangulation the pen tip positions with respect to the position of each magnetic dipole.

According to the invention, the magnetic dipoles are concurrently supplied with alternating currents whose frequencies are different.

According to the invention, the magnetic dipoles are sequentially supplied with the same current, which may be a direct current or an alternating current.

According to the invention, the software is able to discriminate the magnetic fields induced by the dipoles according to the time when each dipole is power supplied.

According to the invention, the first sensor is a magnetometer, and the second sensor is an accelerometer able to measure the gravity field.

According to the invention, the pen further comprises a third sensor intended for detecting the contact of the pen tip with the writing board and for measuring the contact force of the said tip on the said board.

The process according to the invention comprises the following steps:
  measuring at least two magnetic fields generated by at least two dipoles over the writing board;
  measuring the inclination of the pen with respect to the vertical;
  transmitting the measured values to a processing unit which calculates the distance between the position of the pen and the position of each magnetic dipole, in terms of the measured values of the magnetic fields and the pen inclination.

Moreover, the process includes a step for detecting the contact of the pen tip with the digitising board and for measuring the contact force of the tip onto the board.

Other characteristics and advantages of the invention will be detailed in the following description which is an example, in no way restrictive, of an embodiment of the invention, illustrated by the annexed figures:

FIG. 1, which shows a writing digitising device following the invention which includes a locating system according to the invention.

Figure 2:
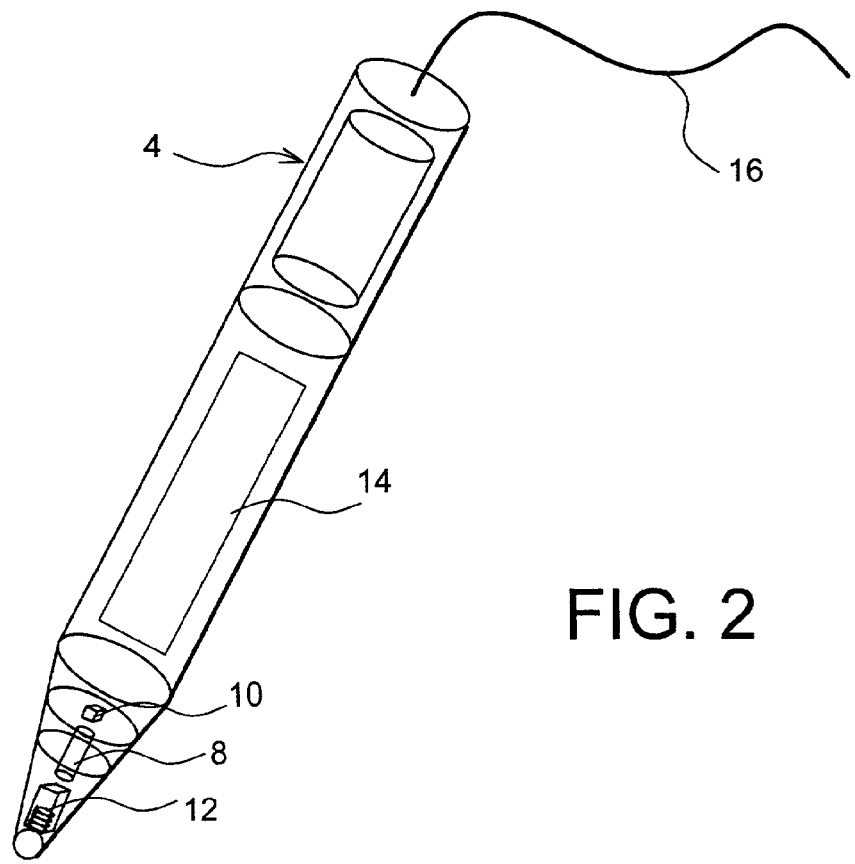

FIG. 2, which shows a pen as used in the system presented on FIG. 1.

Figure 3:
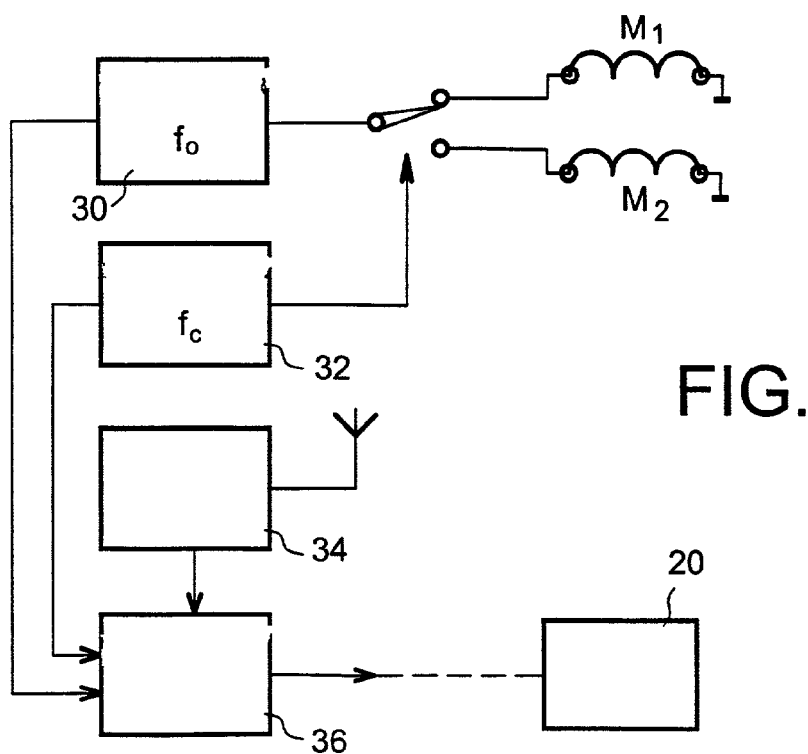

FIG. 3, which shows a magnetic field generation system according to an embodiment of the invention.

Figure 4:
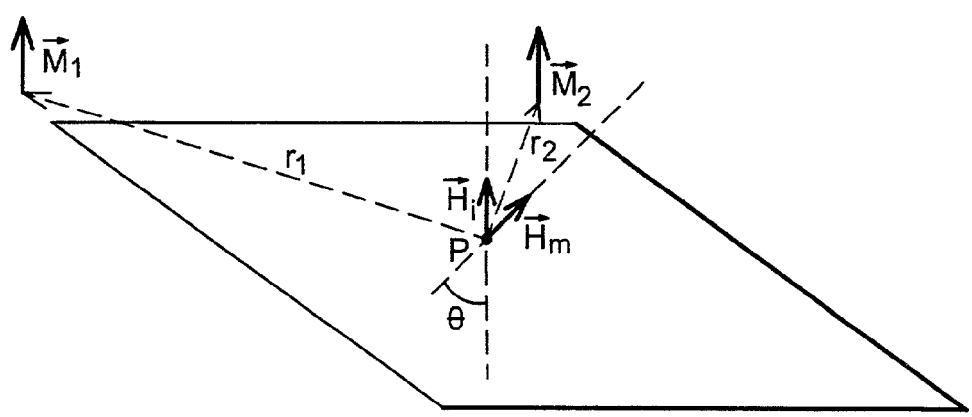

FIG. 4, which schematises the magnetic fields generated by the device described on FIG. 3.

The digitising system on FIG. 1 includes a writing board 2, which may be horizontal, vertical or inclined by an angle of any value with respect to the vertical, on which one may write documents, using a pen 4. This board 2 includes two magnetic dipoles $6_1$ and $6_2$ whose axes are perpendicular to the writing board, each being intended for generating a magnetic field along the direction of pen 4.

As it is shown on FIG. 2, pen 4 is fitted with a magnetometer 8 intended for measuring the magnetic fields generated by the dipoles $6_1$ and $6_2$, an inclinometer 10 intended for measuring the inclination angle $\theta$ of pen 4 axis with respect to the vertical, a force sensor 12 intended for measuring the contact force of the pen onto the board 2, and a processing electronic circuit 14 intended for coding the magnetic field values, the inclination angle $\theta$ value, and the measured contact force. The electronic circuit 14 is connected to an antenna 16 which transmits the coded data issued by the circuit 14 towards a processing unit 20 (FIG. 3) able to calculate the position of pen 4 on the surface of the writing board 2.

Preferably, the magnetic dipoles $6_1$, $6_2$ are cylindrical coils whose cross-section is S, whose diameter is about 1 cm and whose length is about 1 cm. Each coils is made of n spires, n being typically equal to 100, wherein a current of intensity i is circulating.

FIG. 3 gives a schematic implementation of a control circuit of dipoles $6_1$, $6_2$, intended for generating two distinct magnetic fields at pen 4 location. This control circuit includes an oscillator 30, a switch 32, a receiving circuit 34 and a decoding circuit 36.

Alternatively, the coils $6_1$, $6_2$ are supplied sequentially via the switch 32 by an alternating current whose frequency $f_0$ is 100 kHz, the switch 32 being switched every 10 ms.

Alternatively, the coils $6_1$, $6_2$ are supplied with two currents whose frequencies are different.

On FIG. 4, $M_1$ and $M_2$ are the respective positions of the dipoles $6_1$ and $6_2$ on the board 2, P being the position of the pen tip on the board 2, $H_i$ showing the magnetic field created at point P along the pen axis by the dipole $6_i$.

In the particular case when board 2 is horizontal and pen 4 is inclined by an angle θ with respect to the vertical, the value of the projected magnetic field induced by the dipole $6_i$ at point P is equal to:

$$H_{mi}=H_i \cos θ=M_i/r^3 \cos θ$$

where $M_1$ is the dipole moment of the dipole $6_i$ whose value is: $M_i=n\times I\times S$, for a coil of n spires whose section is S, where the circulating current has an intensity I.

From the measured values $M_i$, Hmi and cos θ and the discriminated values of the fields of the two dipoles $6_1$ and $6_2$, one may derive the distances $r_1$ and $r_2$ of point P with respect to points $M_1$ and $M_2$, then the tip position by triangulation.

In the particular case when the writing board 2 is vertical, $$H_{mi}=H_i \sin θ=M/r^3 \sin θ$$

The same calculation yields the distances $r_1$ and $r_2$, then the position of pen tip with respect to points $M_1$ and $M_2$.

In the particular case when the board 2 is inclined by an angle of any value with respect to the horizontal:
$H_{mi}=H_i \sin δ=M/r^3 \sin δ$, where delta=θ−α, α being the inclination angle of the board with respect to the horizontal.

The measured values of the magnetic field, pen axis inclination and contact force are transmitted by radio or via a link wire to the processing unit 20 which receives digital signals proportional to the magnetic field $H_{m1}$ and $H_{m2}$ as measured by the magnetometer by using the synchronism signal of the switch 32.

The dipoles $6_1$ and $6_2$ are located at fixed points with respect to board 2.

Following the preferred invention embodiment, the magnetometer 8 is located in the pen body, and comprises a hundred of spires. The inclinometer 10 is an accelerometer able to measure the projection of the gravity field along pen axis, the sensor 12 is a piezoelectric sensor.

The calculation of the tip position on board 2 is completed only once the contact force measured by the piezoelectric sensor 12 is larger than a predetermined threshold value. Besides, the analysis of the contact force of the tip onto the board 2 yields calligraphic information (downstrokes and lightstrokes) about handwriting. In the case of a signature recognition, this information improves recognition reliability.

According to another embodiment of the invention, the processing unit is built-in in the pen body and further comprises a memory to store the calculated sequence of pen tip positions. The pen includes an interface to transmit the recorded values later to a microcomputer.

The invention claimed is:

1. A digitizing system comprising:
a writing board;
a writing pen;
a processing unit;
at least two magnetic dipoles each being coupled with a current source so as to produce distinct magnetic fields perpendicular to the writing board plane,
wherein said pen includes a magnetic field sensor configured to measure the distinct magnetic fields and an inclination sensor configured to measure an inclination angle θ of the pen with respect to a vertical reference direction; and
transmission means for delivering to said processing unit the distinct magnetic field values measured by said magnetic field sensor and the inclination angle θ values of said pen measured by said inclination sensor, said processing unit calculating a position of said pen on said writing board plane in terms of the measured magnetic field values and the inclination angle θ values.

2. The digitizing system according to claim 1, wherein said pen further comprises a contact sensor for detecting a contact of said pen with said writing board and for measuring a contact force of said pen onto said writing board.

3. The digitizing system according to claim 1, wherein the processing unit is provided with a software which calculates by triangulation the positions of said pen with respect to said magnetic dipoles.

4. The digitizing system according to claim 1, wherein said current source concurrently supplies each of the magnetic dipoles with alternating currents whose frequencies are different.

5. The digitizing system according to claim 1, wherein said current source sequentially supplies each of the magnetic dipoles with the same current.

6. The digitizing system according to claim 1, wherein said current source supplies each of the said dipoles with a direct current.

7. The digitizing system according to claim 5, wherein said current source supplies each of said dipoles with an alternating current.

8. The digitizing system according to claim 4, wherein the calculation software is configured to discriminate the magnetic fields induced by each magnetic dipole according to a frequency of a coil supply current provided by current source to each magnetic dipole.

9. The digitizing system according to claim 5, wherein the calculation software is configured to discriminate the magnetic fields induced by each magnetic dipole according to a supply time of the source current to each magnetic dipole.

10. The digitizing system according to claim 1, wherein said magnetic field sensor is a magnetometer and said inclination sensor is an accelerometer able to measure a gravity field.

11. Method for locating a position of a pen on a writing board, of a digitizing system, comprising the steps of:
measuring at least two magnetic fields generated on said writing board by at least two dipoles;
measuring an inclination θ of said pen with respect to a reference vertical direction;
calculating a distance between said pen and each dipole in terms of measured values of the magnetic fields and of the inclination θ of said pen.

12. The method according to claim 11, further comprising the step of detecting a contact of said pen with the writing board and measuring a contact force of said pen onto said writing board.

* * * * *